Patented June 2, 1936

2,042,910

UNITED STATES PATENT OFFICE 2,042,910

COMPOUND ELASTIC THREAD

Leo Silverman, Elkins Park, Pa., assignor to Leo Silverman and Herbert B. Loeb, Philadelphia, Pa., a partnership trading as Silverman-Loeb Yarn Company Application February 26, 1936, Serial No. 65,744

5 Claims. (Cl. 117—57)

The object of my invention is to produce an elastic yarn having a cover comprising a substantially inelastic but flexible thin strip of smooth transparent material such, for example, as a film of glycerinated regenerated cellulose, hereinafter referred to as cellulose.

A preferred embodiment of the invention is shown in the drawing, in which—

Figure 1:
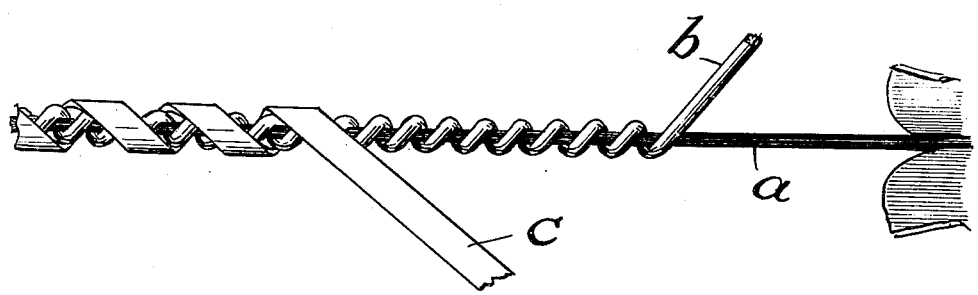
Fig. 1 is a view of my improved compound elastic yarn in process of manufacture.

In the manufacture of the compound elastic yarn I provide a core $a$ of rubber. The rubber core may be rectangular or round in cross-section. If of rectangular cross-section (square as shown in Figure 1), it may be produced by cutting from a sheet of rubber a multiplicity of strips each (preferably) of a width equal to the thickness of the rubber sheet. If of round cross-section, as shown at $d$ in Fig. 3, the core may be made from a rubber latex composition, or a plastic rubber composition, which is extruded in a continuous stream through an orifice of a size corresponding to the desired cross-sectional size of the core. The diameter or thickness of the rubber core thread may vary from one-fourth to one-hundredth of an inch.

Figure 2:
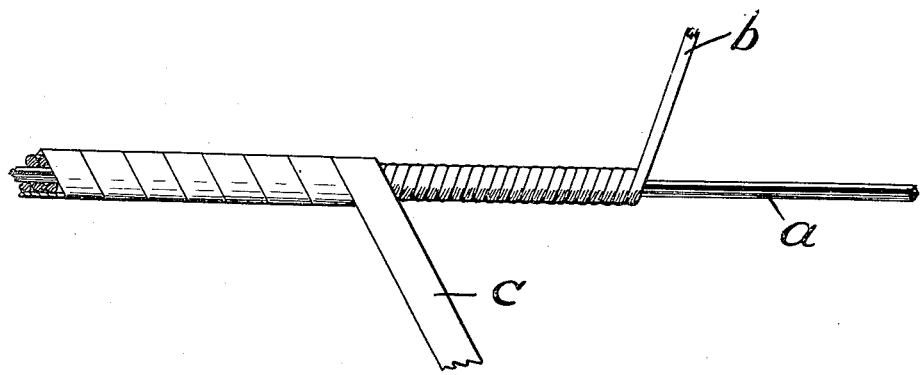
Fig. 2 is a view of the completed compound elastic yarn not under tension.
Figure 3:
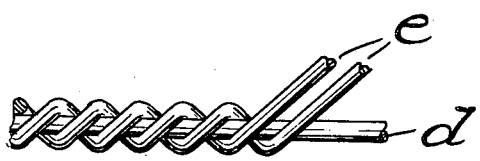
Fig. 3 is a view of a modification.

The rubber core thread is placed under tension. It may be stretched to from twice to five times its length when not under tension. While held under tension, it is spirally wound with a thread $b$ of a suitable textile fabric (such, for example, as cotton, rayon or silk yarn), as shown in Figure 1; or the rubber core thread may be spirally wound with two or more threads $e$, as shown in Fig. 3. The successive turns of the spiral should be spaced apart and, preferably, spaced apart such a distance that, when the tension on the rubber core thread is removed, the successive turns will be contiguous but not overlap, as shown in Fig. 2. It is not essential, however, that the successive turns of the spirally wound thread should be spaced apart the precise distance specified, since it is not necessary that such turns, when the rubber core thread is not under tension, should be absolutely contiguous or that, on the other hand, they should not overlap to some extent; but it is preferable that the turns, when the rubber core thread is not under tension, should be approximately contiguous and should not overlap to the extent of producing a lumpy surface.

Upon the covered rubber core is wound a strip $c$ of transparent cellulose. The width of the strip may vary from one-fourth to one-hundredth of an inch and is multiple times its thickness, which may vary from .00088 inch to several thousandths of an inch. The winding of the cellulose strip should proceed concurrently with the winding of the textile fabric thread, as illustrated in Fig. 1. The successive turns of the strip should be spaced apart such a distance that when the tension on the covered rubber core thread is removed and the thread contracts to normal length, the successive turns will be substantially contiguous, as shown in Fig. 2, and thus substantially completely cover the textile fabric thread. Owing to the extreme thinness of the cellulose strip, it is practicable to so wind it that successive turns will overlap when the rubber core thread is not under tension.

It is desirable that the textile fabric thread and the cellulose strip should be wound in opposite directions, that is, one clockwise and the other counter-clockwise.

The color of the cellulose strip may be of the same color as that of the intermediate covering thread, so that, when the compound thread is stretched, it will have a uniform color the same as it has when unstretched; or, alternatively, the rubber core thread may be of the same color as that of the cellulose strip and the intermediate covering thread may be white, so that, when the compound thread is stretched so as to separate the windings of both the textile fabric thread and the outer covering strip, the partly exposed rubber core thread and the outer covering strip will be of the same color; or all three components may be colored alike.

Attempts to cover a rubber core thread with transparent cellulose have heretofore been unsuccessful owing to the smooth and slippery character of both the cellulose material and the rubber core thread, by reason of which, in alternately pulling and relaxing the rubber core thread, the windings of the cellulose strip failed to maintain their position on the rubber core thread. The intermediate spirally wound covering thread of textile material, however, was found to present a surface sufficiently rough to maintain the windings of the cellulose strip in substantially fixed relation thereto.

I am aware that it is not novel, broadly, to cover a rubber core thread with a plurality of layers of covering thread, but in my improved compound thread, the intermediate and outer covering layers are of essentially different materials and the intermediate layer performs an essentially different function.

The compound elastic thread shown and described is capable of various uses, such as for use in the production of woven and knitted fabrics, for example, suspenders and belts, and as a sheath for wires conducting electricity.

What I claim and desire to protect by Letters Patent is:

1. A compound elastic thread comprising an inner rubber core thread, an intermediate textile fabric thread spirally wound upon the rubber core thread and an outer covering strip, relatively wide and thin, of glycerinated regenerated cellulose spirally wound upon the intermediate thread, the textile fabric thread having a surface of such greater roughness than that of the inner core or outer strip that the latter maintains a substantially fixed relation thereto in the elongation and contraction of the compound thread.

2. A compound elastic thread comprising an inner rubber core thread, an intermediate textile fabric thread spirally wound upon the rubber core thread, and an outer covering strip of glycerinated regenerated cellulose spirally wound upon the intermediate thread, the outer covering strip having a width, and the rubber core and intermediate thread having a thickness, multiple times the thickness of the outer covering strip.

3. A compound elastic thread comprising an inner rubber core thread, an intermediate textile fabric thread spirally wound upon the rubber core thread and an outer covering strip, relatively wide and thin, of glycerinated regenerated cellulose spirally wound upon the intermediate thread, the spiral turns of the covering strip being substantially contiguous when the compound thread is not under tension and being spaced apart in an axial direction when the compound thread is stretched to its maximum.

4. A compound elastic thread comprising an inner rubber core thread, an intermediate textile fabric thread spirally wound upon the rubber core thread and an outer covering strip, relatively wide and thin, of glycerinated regenerated cellulose spirally wound upon the intermediate thread, the spiral turns of the intermediate thread being substantially contiguous without substantial overlapping when the compound thread is not under tension and being spaced apart in an axial direction when the compound thread is substantially elongated.

5. A compound elastic thread comprising an inner rubber core thread, an intermediate textile fabric thread spirally wound upon the rubber core thread and an outer, transparent, relatively wide and thin covering strip of glycerinated regenerated cellulose spirally wound upon the intermediate strip, the outer covering strips and one of the other specified constituent elements being of the same color.

LEO SILVERMAN.